US012461865B2

(12) United States Patent
Kono

(10) Patent No.: US 12,461,865 B2
(45) Date of Patent: Nov. 4, 2025

(54) VEHICLE-MOUNTED APPARATUS, VEHICLE-MOUNTED COMMUNICATION SYSTEM, AND COMMUNICATION CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Tomoya Kono, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 161 days.

(21) Appl. No.: 18/249,561

(22) PCT Filed: Oct. 4, 2021

(86) PCT No.: PCT/JP2021/036653
§ 371 (c)(1),
(2) Date: Apr. 19, 2023

(87) PCT Pub. No.: WO2022/085409
PCT Pub. Date: Apr. 28, 2022

(65) Prior Publication Data
US 2024/0020244 A1    Jan. 18, 2024

(30) Foreign Application Priority Data
Oct. 20, 2020  (JP) ................................ 2020-175700

(51) Int. Cl.
*G06F 13/10*    (2006.01)

(52) U.S. Cl.
CPC ................................. *G06F 13/102* (2013.01)

(58) Field of Classification Search
CPC ...................................................... G06F 13/102
(Continued)

(56) References Cited

U.S. PATENT DOCUMENTS 11,721,138 B1 * 8/2023 Elmasri ............... G06F 11/3476
701/1
11,962,433 B2 * 4/2024 Iwata .................. H04L 12/4645
(Continued)

FOREIGN PATENT DOCUMENTS

JP    2003-049704 A    2/2003
JP    2004-349961 A    12/2004
(Continued)

OTHER PUBLICATIONS

International Search Report, Application No. PCT/JP2021/036653, mailed Nov. 16, 2021. ISA/Japan Patent Office.

*Primary Examiner* — Christopher B Shin
(74) *Attorney, Agent, or Firm* — Honigman LLP

(57) ABSTRACT

A vehicle-mounted apparatus that is connected to a plurality of peripheral vehicle-mounted apparatuses, wherein each of the peripheral vehicle-mounted apparatuses includes a plurality of communication ports. The vehicle-mounted apparatus includes: a storage unit that stores port information indicating correspondence between the plurality of communication ports in each peripheral vehicle-mounted apparatus and devices connected to the communication ports; and a transmission unit that includes, based on the port information stored in the storage unit, output destination information indicating a communication port, out of the plurality of communication ports, to be used as an output destination of one of control information for controlling a device and device control information based on the control information in a frame together with the control information and trans- (Continued)

mits the frame to the peripheral vehicle-mounted apparatuses.

6 Claims, 13 Drawing Sheets

(58) Field of Classification Search
USPC .......................................................... 710/30
See application file for complete search history.

(56) References Cited

U.S. PATENT DOCUMENTS

| 12,162,415 | B2* | 12/2024 | Kurokawa | ............... | H04L 65/40 |
| 2005/0222726 | A1* | 10/2005 | Furui | .................. | B60R 16/0231 |
| | | | | | 701/1 |
| 2006/0052919 | A1* | 3/2006 | Hong | ..................... | G07C 5/008 |
| | | | | | 701/1 |
| 2014/0068099 | A1* | 3/2014 | Komori | ................. | H04L 45/745 |
| | | | | | 709/236 |
| 2016/0021127 | A1* | 1/2016 | Yan | ........................ | H04W 12/08 |
| | | | | | 726/23 |
| 2016/0065298 | A1* | 3/2016 | Nakagawa | ......... | H04B 7/15528 |
| | | | | | 370/315 |
| 2016/0325754 | A1* | 11/2016 | Stahulak | ............. | B60W 50/085 |
| 2018/0227147 | A1* | 8/2018 | Kataoka | .................. | H04L 12/40 |
| 2020/0053003 | A1 | 2/2020 | Shikata et al. | | |
| 2021/0184886 | A1* | 6/2021 | Maeda | .................... | H04L 69/18 |
| 2023/0179659 | A1* | 6/2023 | Go | ........................ | B60R 16/023 |
| | | | | | 709/201 |
| 2024/0129301 | A1* | 4/2024 | Kim | ...................... | H04L 63/101 |

FOREIGN PATENT DOCUMENTS

| JP | 2015-166213 A | 9/2015 |
| JP | 2017-224891 A | 12/2017 |
| WO | 2011-148925 A1 | 12/2011 |

* cited by examiner

FIG. 5

| Integrated ECU 501 | | | |
|---|---|---|---|
| Port | Function | Connected to | A |
| P71 | B | Output | CAN |

T61

LEGEND
A= Communication
B= Individual Connection

FIG. 6

| ID | Function |
|---|---|
| 301 | Door-Related Load |
| ... | ... |

T62

Before Updating

⇒

| ID | Function |
|---|---|
| 300 | Window-Related Load |
| 301 | Door-Related Load |
| ... | ... |

T62

After Updating

Before Updating

After Updating

LEGEND
A= Communication
B= Door-Related Load
C= Window-Related Load
D= Inter-ECU Communication

FIG. 10

LEGEND
A= Communication
B= Individual Connection
C= Door-Related Load
D= Inter-Ecu Communication
E= Window-Related Load Port Table (T21) — After Updating Integrated ECU 201

| Port | Function | Connected to | |
|---|---|---|---|
| P11 | B | Output | CAN |

Individual ECU 101A

| Port | Function | Connected to | |
|---|---|---|---|
| P1 | ... | ... | A |

Individual ECU 101B

| Port | Function | Connected to | |
|---|---|---|---|
| P1 | Light Input | CXPI | A |
| P2 | E | ACT1 | LIN |
| P3 | C | ACT2 | LIN |
| P4 | D | Integrated | CAN |

Individual ECU 101C

| Port | Function | Connected to | |
|---|---|---|---|
| P1 | ... | ... | A |

Port Table (T21) — Before Updating

Integrated ECU 201

| Port | Function | Connected to | |
|---|---|---|---|
| P11 | B | Output | CAN |

Individual ECU 101A

| Port | Function | Connected to | |
|---|---|---|---|
| P1 | ... | ... | A |

Individual ECU 101B

| Port | Function | Connected to | |
|---|---|---|---|
| P1 | Light Input | Input | CXPI |
| P2 | Empty | None | |
| P3 | C | ACT2 | LIN |
| P4 | D | Integrated | CAN |

Individual ECU 101C

| Port | Function | Connected to | |
|---|---|---|---|
| P1 | ... | ... | A |

Before Updating → After Updating

LEGEND
A= Window-Related Load
B= Door-Related Load

| Individual ECU 101B ||||
|---|---|---|---|
| Port | Function | Connected To | A |
| P4 | B | Integrated | CAN |

T11

LEGEND
A= Communication
B= Inter-Ecu Communication

T12

| ID |
|---|
| 301 |
| 302 |
| 303 |

VEHICLE-MOUNTED APPARATUS, VEHICLE-MOUNTED COMMUNICATION SYSTEM, AND COMMUNICATION CONTROL METHOD

CROSS-REFERENCE TO RELATED APPLICATIONS

This application is the U.S. national stage of PCT/JP2021/036653 filed on Oct. 4, 2021, which claims priority of Japanese Patent Application No. JP 2020-175700 filed on Oct. 20, 2020, the contents of which are incorporated herein.

TECHNICAL FIELD

The present disclosure relates to a vehicle-mounted apparatus, a vehicle-mounted communication system, and a communication control method.

BACKGROUND

JP2015-166213A discloses a light control system described below. This light control system includes first lighting apparatuses that are mounted at the front-left and front-right of a vehicle to illuminate the space in front of the vehicle, second lighting apparatuses mounted at the four corners of the front and rear of the vehicle to illuminate the front and rear of the vehicle, a plurality of slave control apparatuses that separately control the first lighting apparatuses on the left and right, and a master control apparatus that controls the slave control apparatuses and also controls the second lighting apparatuses.

In the past, technologies relating to a network configuration capable of flexibly supporting the addition of functions and the like in a vehicle-mounted communication system have been developed.

There is demand for a technology capable of supporting the addition of functions and the like in a vehicle-mounted communication system more flexibly than the technology disclosed in PTL 1 mentioned above.

SUMMARY

The present disclosure was conceived to solve the problem described earlier, and has an object of providing a vehicle-mounted apparatus, a vehicle-mounted communication system, and a communication control method capable of more flexibly supporting the addition of functions and the like in a vehicle-mounted communication system.

A vehicle-mounted apparatus according to an aspect of the present disclosure is a vehicle-mounted apparatus connected to a plurality of peripheral vehicle-mounted apparatuses, wherein each of the peripheral vehicle-mounted apparatuses includes a plurality of communication ports, the vehicle-mounted apparatus including: a storage unit configured to store port information indicating correspondence between the plurality of communication ports in each peripheral vehicle-mounted apparatus and devices connected to the communication ports; and a transmission unit configured to include, based on the port information stored in the storage unit, output destination information indicating a communication port, out of the plurality of communication ports, to be used as an output destination of one of control information for controlling a device and device control information based on the control information in a frame together with the control information, and transmit the frame to the peripheral vehicle-mounted apparatuses.

A vehicle-mounted apparatus according to an aspect of the present disclosure is a vehicle-mounted apparatus which includes a plurality of communication ports and includes: a reception unit configured to receive a frame including control information for controlling a device connected to a communication port and output destination information indicating a communication port to be used as an output destination of one of the control information and device control information based on the control information; and an output unit configured to output the control information, or the device control information based on the control information, included in the frame received by the reception unit to the communication port indicated by the output destination information.

A vehicle-mounted communication system according to an aspect of the present disclosure is a vehicle-mounted communication system including: an integrated vehicle-mounted apparatus; and a plurality of peripheral vehicle-mounted apparatuses which each include a plurality of communication ports and are connected to the integrated vehicle-mounted apparatus, wherein the integrated vehicle-mounted apparatus stores port information indicating correspondence between the plurality of communication ports in the peripheral vehicle-mounted apparatuses and devices connected to the communication ports, the integrated vehicle-mounted apparatus includes, based on the port information, output destination information indicating a communication port, out of the plurality of communication ports, to be used as an output destination of one of control information for controlling a device and device control information based on the control information in a frame together with the control information, and transmits the frame to the peripheral vehicle-mounted apparatuses, and a peripheral vehicle-mounted apparatus receives the frame transmitted from the integrated vehicle-mounted apparatus and outputs the control information included in the received frame or the device control information based on the control information to the communication port indicated by the output destination information.

A communication control method according to an aspect of the present disclosure is a communication control method for a vehicle-mounted apparatus connected to a plurality of peripheral vehicle-mounted apparatuses, wherein each of the peripheral vehicle-mounted apparatuses includes a plurality of communication ports, and the vehicle-mounted apparatus stores port information indicating correspondence between the plurality of communication ports of each peripheral vehicle-mounted apparatus and devices connected to the communication ports, the communication control method including: a step of specifying, based on the stored port information, a communication port out of the plurality of communication ports which is to be used as an output destination of control information for controlling the device or device control information based on the control information; and a step of including output destination information indicating the specified communication port in a frame together with the control information, and transmitting the frame to the peripheral vehicle-mounted apparatuses.

A communication control method according to an aspect of the present disclosure is a communication control method for a vehicle-mounted apparatus including a plurality of communication ports, the communication control method including: a step of receiving a frame including control information for controlling a device connected to a communication port and output destination information indicating a communication port to be used as an output destination of the control information or device control information based on the control information; and a step of outputting the control information included in the received frame or the device control information based on the control information to the communication port indicated by the output destination information.

A communication control method according to an aspect of the present disclosure is a communication control method for a vehicle-mounted communication system including an integrated vehicle-mounted apparatus and a plurality of peripheral vehicle-mounted apparatuses that each include a plurality of communication ports and are connected to the integrated vehicle-mounted apparatus, wherein the integrated vehicle-mounted apparatus stores port information indicating correspondence between the plurality of communication ports of each peripheral vehicle-mounted apparatus and devices connected to the communication ports, and the communication control method includes: a step of specifying, by the integrated vehicle-mounted apparatus and based on the stored port information, a communication port out of the plurality of communication ports which is to be used as an output destination of control information for controlling the device or device control information based on the control information; a step of including, by the integrated vehicle-mounted apparatus, output destination information indicating the specified communication port together with the control information in a frame and transmitting the frame to the peripheral vehicle-mounted apparatuses; a step of receiving, by a peripheral vehicle-mounted apparatus, the frame transmitted from the integrated vehicle-mounted apparatus; and a step of outputting, by the peripheral vehicle-mounted apparatus, the control information included in the received frame or the device control information based on the control information to the communication port indicated by the output destination information.

One aspect of the present disclosure can be realized not only as a vehicle-mounted apparatus including the characteristic processing units described above, but also as a program for causing a computer to execute the steps in this characteristic processing or as a semiconductor integrated circuit that realizes part or all of the vehicle-mounted apparatus.

One aspect of the present disclosure can be realized not only as a vehicle-mounted communication system including the characteristic processing units described above, but also as a program for causing a computer to execute the steps in this characteristic processing or as a semiconductor integrated circuit that realizes part or all of the vehicle-mounted communication system.

Advantageous Effects of Invention

According to the present disclosure, it is possible to more flexibly support the addition of functions and the like in a vehicle-mounted communication system.

BRIEF DESCRIPTION OF DRAWINGS

FIG. 5 is a diagram depicting an example of a port table stored in an integrated ECU according to the comparative example.

FIG. 6 is a diagram depicting an example of a function list table stored in an integrated ECU according to the comparative example.

FIG. 10 is a diagram depicting one example of a port table stored in the integrated ECU according to an embodiment of the present disclosure.

DETAILED DESCRIPTION OF PREFERRED EMBODIMENTS

Figure 1:
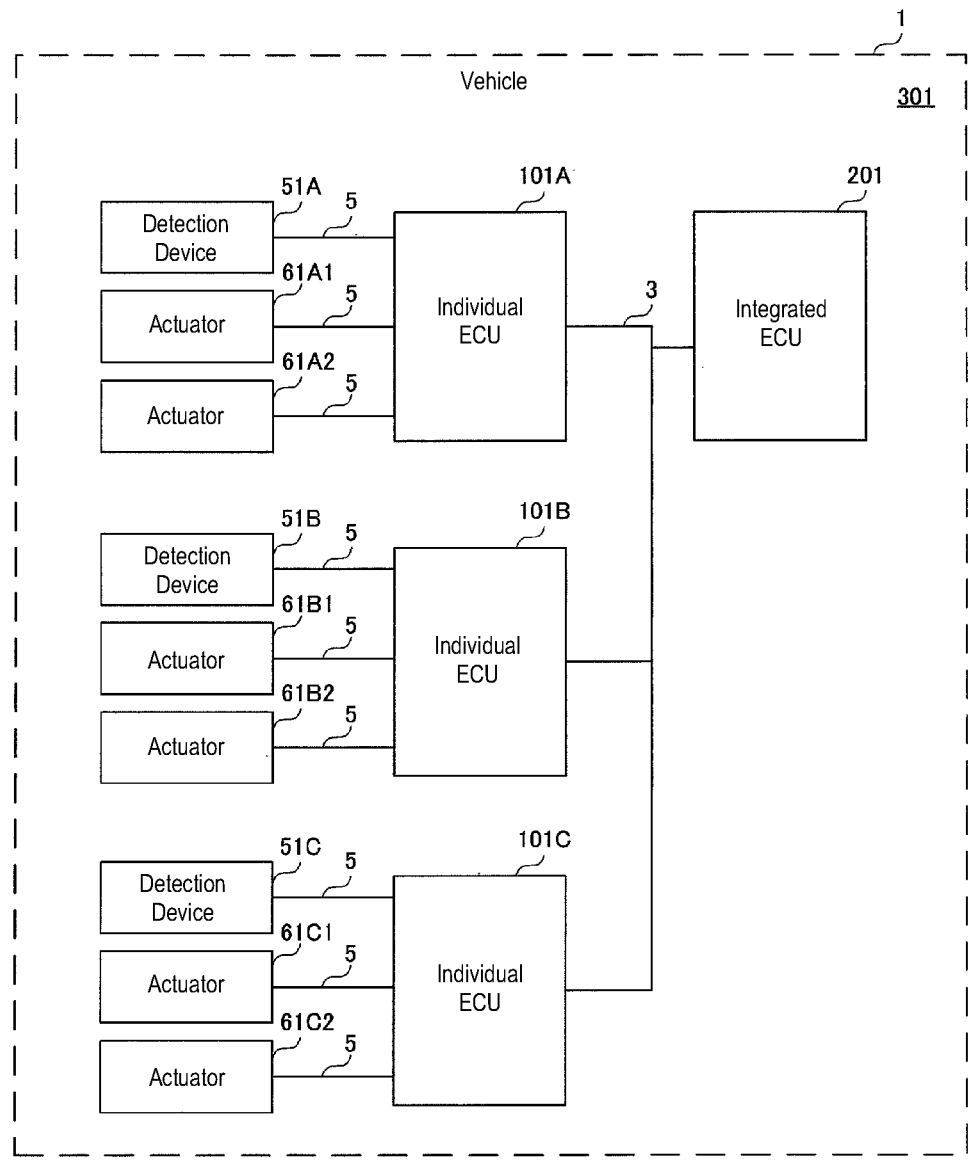
FIG. 1 is a diagram depicting the configuration of a vehicle-mounted communication system according to an embodiment of the present disclosure.

Several embodiments of the present disclosure will first be listed and described in outline.

First Aspect

In accordance with a first aspect, a vehicle-mounted apparatus according to an embodiment of the present disclosure is a vehicle-mounted apparatus connected to a plurality of peripheral vehicle-mounted apparatuses, wherein each of the peripheral vehicle-mounted apparatuses includes a plurality of communication ports, the vehicle-mounted apparatus including: a storage unit configured to store port information indicating correspondence between the plurality of communication ports in each peripheral vehicle-mounted apparatus and devices connected to the communication ports; and a transmission unit configured to include, based on the port information stored in the storage unit, output destination information indicating a communication port, out of the plurality of communication ports, to be used as an output destination of one of control information for controlling a device and device control information based on the control information in a frame together with the control information, and transmit the frame to the peripheral vehicle-mounted apparatuses.

Here, if the vehicle-mounted apparatus and each of the peripheral vehicle-mounted apparatuses were to store information indicating the correspondence between the plurality of communication ports and the devices connected to the plurality of communication ports, it would be necessary to update the information indicating the correspondence described above in both the vehicle-mounted apparatus and the peripheral vehicle-mounted apparatuses whenever a new device is added.

On the other hand, with a configuration where the vehicle-mounted apparatus collectively manages information indicating the correspondence for each peripheral vehicle-mounted apparatus as described above, when a device is newly added, it is sufficient to update the information stored in the vehicle-mounted apparatus, which reduces the time taken by user tasks and makes it easier to perform the addition of functions and the like in a vehicle-mounted communication system. It is therefore possible to more flexibly support the addition of functions and the like in a vehicle-mounted communication system. Also, with the above configuration, it is not necessary for a peripheral vehicle-mounted apparatus to specify the communication port to which a device to be controlled is connected, which means that devices can be driven with simpler processing.

Second Aspect

In a second aspect, the storage unit may further store communication method information indicating correspondence between the plurality of communication ports and a communication method to be used when the peripheral vehicle-mounted apparatus transmits the control information or the device control information to the device via any one of the plurality of communication ports, and the transmission unit may include, based on the communication method information stored in the storage unit, setting information, which indicates a communication method to be used when transmitting the control information or the device control information, in the frame together with the control information, and transmit the frame to the peripheral vehicle-mounted apparatuses.

In this way, when a vehicle-mounted apparatus is additionally configured to collectively manage information on the communication method of each peripheral vehicle-mounted apparatus, it is sufficient, when a new device is added, to update the information described above stored in the vehicle-mounted apparatus, which makes it possible to support the addition of functions and the like in a vehicle-mounted communication system even more flexibly. Also with the above configuration, it is not necessary for a peripheral vehicle-mounted apparatus to specify the communication method corresponding to the device to be controlled, which means that devices can be driven with simpler processing.

Third Aspect

In a third aspect, the port information may indicate functions of the devices connected to the respective communication ports, and the transmission unit may also include identification information of the function of the device to be controlled in the frame and transmit the frame to the peripheral vehicle-mounted apparatus.

With the above configuration, it is not necessary for a peripheral vehicle-mounted apparatus, to which a plurality of devices with a variety of functions are connected, to store detailed information relating to the functions of the devices connected to the communication ports, which makes it possible to reduce the storage area of the peripheral vehicle-mounted apparatus and to reduce the cost.

Fourth Aspect

In a fourth aspect, when a device is newly connected to a communication port to which no device has been connected, information relating to the device may be added to the port information without updating the information stored in each peripheral vehicle-mounted apparatus.

Fifth Aspect

In a fifth aspect, the port information may be updatable using an apparatus which is capable of being connected by wires to a vehicle in which the vehicle-mounted apparatus is mounted.

With this configuration, the port information in the vehicle-mounted communication system can be updated by a simple process.

Sixth Aspect

In a sixth aspect, the port information may be updatable by OTA (Over The Air).

With this configuration, the port information can be updated remotely, which is more convenient for the user.

Seventh Aspect

In a seventh aspect, a vehicle-mounted apparatus according to an embodiment of the present disclosure includes a plurality of communication ports and includes: a reception unit configured to receive a frame including control information for controlling a device connected to a communication port and output destination information indicating a communication port to be used as an output destination of one of the control information and device control information based on the control information; and an output unit configured to output the control information, or the device control information based on the control information, included in the frame received by the reception unit to the communication port indicated by the output destination information.

With this configuration, it is not necessary for the vehicle-mounted apparatus to store information indicating the correspondence between the plurality of communication ports of that vehicle-mounted apparatus and the devices connected to the plurality of communication ports. This means that when a new device is added to a vehicle-mounted apparatus, it is sufficient to update information relating to the communication ports at the transmitter of the control information, which reduces the time taken by user tasks, and makes it easier to perform the addition of functions and the like in a vehicle-mounted communication system. Accordingly, it is possible to more flexibly support the addition of functions and the like in a vehicle-mounted communication system. In addition, with the above configuration, it is not necessary for the vehicle-mounted apparatus to specify the communication port corresponding to the device to be controlled, which means that devices can be driven with simpler processing.

Eighth Aspect

In an eighth aspect, the vehicle-mounted apparatus may further includes a storage unit configured to store port information indicating a communication port, out of the plurality of communication ports, to which an integrated vehicle-mounted apparatus, which is a transmitter of the control information, is connected.

With the above configuration, as one example, when a vehicle-mounted apparatus transmits response information in response to control information to the transmitter of the control information, the communication port to be used as the output destination of the response information can be easily specified.

Ninth Aspect

In a ninth aspect, the port information may be composed of identification information of the communication port to which the integrated vehicle-mounted apparatus is connected, a function of the integrated vehicle-mounted apparatus, and a communication method for communication with the integrated vehicle-mounted apparatus.

With the above configuration, it is not necessary for a peripheral vehicle-mounted apparatus to store detailed information relating to the devices connected to the communication ports, which makes it possible to reduce the storage area of the peripheral vehicle-mounted apparatus and to reduce cost.

Tenth Aspect

In a tenth aspect, the storage unit may further store function information indicating a list of identification information of functions in the vehicle-mounted apparatus, and the output unit may determine, based on identification information of a function of the device to be controlled which is included in the frame received by the reception unit, whether to output the control information or the device control information to the communication port indicated by the output destination information.

With the above configuration, at a peripheral vehicle-mounted apparatus to which a plurality of devices with a variety of functions are connected, it is possible, while storing simple information relating to the devices connected to the communication ports and reducing the storage area, to determine whether a device that is the target for control in the received control information is connected to a communication port.

Eleventh Aspect

In an eleventh aspect, a vehicle-mounted communication system according to an embodiment of the present disclosure includes: an integrated vehicle-mounted apparatus; and a plurality of peripheral vehicle-mounted apparatuses which each include a plurality of communication ports and are connected to the integrated vehicle-mounted apparatus, wherein the integrated vehicle-mounted apparatus stores port information indicating correspondence between the plurality of communication ports in the peripheral vehicle-mounted apparatuses and devices connected to the communication ports, the integrated vehicle-mounted apparatus includes, based on the port information, output destination information indicating a communication port, out of the plurality of communication ports, to be used as an output destination of one of control information for controlling a device and device control information based on the control information in a frame together with the control information, and transmits the frame to the peripheral vehicle-mounted apparatuses, and a peripheral vehicle-mounted apparatus receives the frame transmitted from the integrated vehicle-mounted apparatus and outputs the control information included in the received frame or the device control information based on the control information to the communication port indicated by the output destination information.

In this way, with a configuration where the integrated vehicle-mounted apparatus collectively manages the information relating to the communication ports of the respective peripheral vehicle-mounted apparatuses, when a new device is added, it is sufficient to update the information stored in the integrated vehicle-mounted apparatus, which means that it is possible to reduce the time taken by user tasks and to more easily perform the addition of functions and the like in the vehicle-mounted communication system. Accordingly, it is possible to more flexibly respond to the addition of functions and the like in a vehicle-mounted communication system. Also with the above configuration, it is not necessary for the peripheral vehicle-mounted apparatus to specify the communication port to which the device to be controlled is connected, which means that devices can be driven with simpler processing.

Twelfth Aspect

In a twelfth aspect, the integrated vehicle-mounted apparatus may further store communication method information indicating correspondence between the plurality of communication ports and a communication method to be used when the peripheral vehicle-mounted apparatus transmits the control information or the device control information to a device via any one of the plurality of communication ports, the integrated vehicle-mounted apparatus may include, based on the stored communication method information, setting information indicating a communication method to be used when transmitting the control information or the device control information in the frame together with the control information, and transmit the frame to the peripheral vehicle-mounted apparatuses, and a peripheral vehicle-mounted apparatus may output the control information or the device control information to the communication port indicated by the output destination information according to the communication method indicated by the setting information included in the frame received from the integrated vehicle-mounted apparatus.

In this way, when the integrated vehicle-mounted apparatus is further configured to collectively manage information on the communication method for each peripheral vehicle-mounted apparatus, it is sufficient, when a new device is added, to update the above information stored in the integrated vehicle-mounted apparatus, which makes it possible to respond more flexibly to the addition of functions and the like in the vehicle-mounted communication system. Also, with the above configuration, it is not necessary for the peripheral vehicle-mounted apparatus to specify the communication method corresponding to the device to be controlled, which means that devices can be driven by simpler processing.

Thirteenth Aspect

In a thirteenth aspect, a communication control method according to an embodiment of the present disclosure is a communication control method for a vehicle-mounted apparatus connected to a plurality of peripheral vehicle-mounted apparatuses, wherein each of the peripheral vehicle-mounted apparatuses includes a plurality of communication ports, and the vehicle-mounted apparatus stores port information indicating correspondence between the plurality of communication ports of each peripheral vehicle-mounted apparatus and devices connected to the communication ports, the communication control method including: a step of specifying, based on the stored port information and out of the plurality of communication ports, a communication port to be used as an output destination of control information for controlling the device or device control information based on the control information; and a step of including output destination information indicating the specified communication port in a frame together with the control information, and transmitting the frame to the peripheral vehicle-mounted apparatuses.

In this way, when the vehicle-mounted apparatus collectively manages information relating to the communication ports of each peripheral vehicle-mounted apparatus, it is sufficient, when a new device is added, to update the above information stored in the vehicle-mounted apparatus, which reduces the time taken by user tasks and makes it easier to perform the addition of functions and the like in a vehicle-mounted communication system. It is therefore possible to more flexibly support the addition of functions and the like in a vehicle-mounted communication system. Also, with the method described above, it is not necessary at the peripheral vehicle-mounted apparatus to specify the communication port to which the device to be controlled is connected and the like, which means that devices can be driven with simpler processing.

Fourteenth Aspect

In a fourteenth aspect, a communication control method according to an embodiment of the present disclosure is a communication control method for a vehicle-mounted apparatus including a plurality of communication ports, the communication control method including: a step of receiving a frame including control information for controlling a device connected to a communication port and output destination information indicating a communication port to be used as an output destination of the control information or device control information based on the control information; and a step of outputting the control information included in the received frame or the device control information based on the control information to the communication port indicated by the output destination information.

With the above method, it is not necessary for a vehicle-mounted apparatus to store information indicating the correspondence between the plurality of communication ports of that vehicle-mounted apparatus and devices connected to the plurality of communication ports. This means that when a new device is added to a vehicle-mounted apparatus, it is sufficient to update information relating to the communication ports at the transmitter of the control information, which reduces the time taken by user tasks, and makes it easier to perform the addition of functions and the like in a vehicle-mounted communication system. Accordingly, it is possible to more flexibly support the addition of functions and the like in a vehicle-mounted communication system. Also, with the method described above, it is not necessary at the vehicle-mounted apparatus to specify the communication port corresponding to the device to be controlled, which means that devices can be driven with simpler processing.

Fifteenth Aspect

In a fifteenth aspect, a communication control method according to an embodiment of the present disclosure is a communication control method for a vehicle-mounted communication system including an integrated vehicle-mounted apparatus and a plurality of peripheral vehicle-mounted apparatuses that each include a plurality of communication ports and are connected to the integrated vehicle-mounted apparatus, wherein the integrated vehicle-mounted apparatus stores port information indicating correspondence between the plurality of communication ports of each peripheral vehicle-mounted apparatus and devices connected to the communication ports, and the communication control method includes: a step of specifying, by the integrated vehicle-mounted apparatus and based on the stored port information, a communication port out of the plurality of communication ports which is to be used as an output destination of control information for controlling the device or device control information based on the control information; a step of including, by the integrated vehicle-mounted apparatus, output destination information indicating the specified communication port together with the control information in a frame and transmitting the frame to the peripheral vehicle-mounted apparatuses; a step of receiving, by a peripheral vehicle-mounted apparatus, the frame transmitted from the integrated vehicle-mounted apparatus; and a step of outputting, by the peripheral vehicle-mounted apparatus, the control information included in the received frame or the device control information based on the control information to the communication port indicated by the output destination information.

In this way, with a configuration where an integrated vehicle-mounted apparatus collectively manages information relating to the communication ports of the respective peripheral vehicle-mounted apparatuses, when a new device is added, it is sufficient to update the above information stored in the integrated vehicle-mounted apparatus, which reduces the time taken by user tasks and makes it easier to perform the addition of functions and the like in a vehicle-mounted communication system. Accordingly, it is possible to more flexibly support the addition of functions and the like in a vehicle-mounted communication system. Also, with the above configuration, it is not necessary at the peripheral vehicle-mounted apparatus to specify the communication port to which the device to be controlled is connected, which means that devices can be driven with simpler processing.

Embodiments of the present disclosure will now be described with reference to the attached drawings. Note that identical or corresponding parts in the drawings have been assigned the same reference numerals and description thereof is not repeated. In addition, at least some parts of the embodiments described below may be freely combined.

Configuration and Basic Operation

FIG. 1 is a diagram depicting the configuration of a vehicle-mounted communication system according to an embodiment of the present disclosure. As depicted in FIG. 1, the vehicle-mounted communication system 301 includes an integrated ECU (Electronic Control Unit) 201, individual ECUs (or "peripheral vehicle-mounted apparatuses") 101A, 101B, and 101C, detection devices 51A, 51B, and 51C, and actuators 61A1, 61A2, 61B1, 61B2, 61C1, and 61C2. The vehicle-mounted communication system 301 is mounted on a vehicle 1.

In the following description, the respective detection devices 51A, 51B, and 51C are collectively referred to as the "detection devices 51", the respective actuators 61A1, 61A2, 61B1, 61B2, 61C1, and 61C2 are collectively referred to as the "actuators 61", and the respective individual ECUs 101A, 101B, and 101C are also collectively referred to as the "individual ECUs 101".

The integrated ECU 201 is connected to the individual ECU 101A, the individual ECU 101B, and the individual ECU 101C via cables 3. As one example, the vehicle-mounted communication system 301 is configured as a network in which the integrated ECU 201 controls driving of the actuators 61 by the respective individual ECUs 101. In this network configuration, since it is possible to add new functions to the vehicle-mounted communication system 301 by a simple method, such as updating the firmware of the integrated ECU 201, it is possible to flexibly support needs, such as the addition of functions to the vehicle-mounted communication system 301.

The detection device 51A and the actuators 61A and 61B are connected to the individual ECU 101A via respective cables 5. The detection device 51B and the actuators 61B1 and 61B2 are connected to the individual ECU 101B via respective cables 5. The detection device 51C and the actuators 61C1 and 61C2 are connected to the individual ECU 101C via respective cables 5.

As examples, the cables 3 and 5 are transmission lines that comply to a standard such as CAN (Controller Area Network) (registered trademark), FlexRay (registered trademark), MOST (Media Oriented Systems Transport) (registered trademark), Ethernet (registered trademark), LIN (Local Interconnect Network), or CXPI (Lock Extension Peripheral Interface). Note that the cables 3 and 5 may for example be signal lines capable of transmitting analog signals.

The detection device 51 detects information relating to the vehicle 1. As one example, the detection device 51 is a variety of sensors or a variety of switches. As one example, a sensor is a luminance sensor that measures the luminance in the periphery of the vehicle 1, periodically performs measurement, stores sensor data indicating measurement results in a frame conforming to the CAN, LIN, or CXPI standard, and transmits the frame to an individual ECU 101.

As examples, the switch is a switch that switches on and off in conjunction with opening and closing of the door of the vehicle 1, detects its own on or off state, stores monitor data indicating the detection result in a frame conforming to the CAN, LIN, or CXPI standard, and transmits the frame to the individual ECU 101. Sensor data and monitor data are hereinafter also referred to as "detection data".

Each individual ECU 101 receives detection data from the detection device 51 to which that individual ECU 101 is connected, and transmits the received detection data to the integrated ECU 201. As one example, the integrated ECU 201 generates control information for driving an actuator 61 based on detection data received from an individual ECU 101, and transmits the generated control information to the same individual ECU 101 or to an individual ECU 101 that differs to that individual ECI. In more detail, when the integrated ECU 201 has received detection data indicating that the luminance in the periphery of the vehicle 1 is low, the integrated ECU 201 generates control information for lighting the lamps of the vehicle 1 and transmits the generated control information to the individual ECUs 101. Each individual ECU 101 receives the control information from the integrated ECU 201 and drives, based on the received control information, an actuator 61 which is connected to that individual ECU 101 and supports a lighting function for the lamps.

Note that the vehicle-mounted communication system 301 may be configured to include two or more integrated ECUs 201. In addition, the vehicle-mounted communication system 301 may be configured to include four or more individual ECUs 101. The number of detection devices 51 connected to each individual ECU 101 may be two or more. Likewise, the number of actuators 61 connected to each individual ECU 101 may be one, or may be three or more.

Individual ECU

Figure 2:
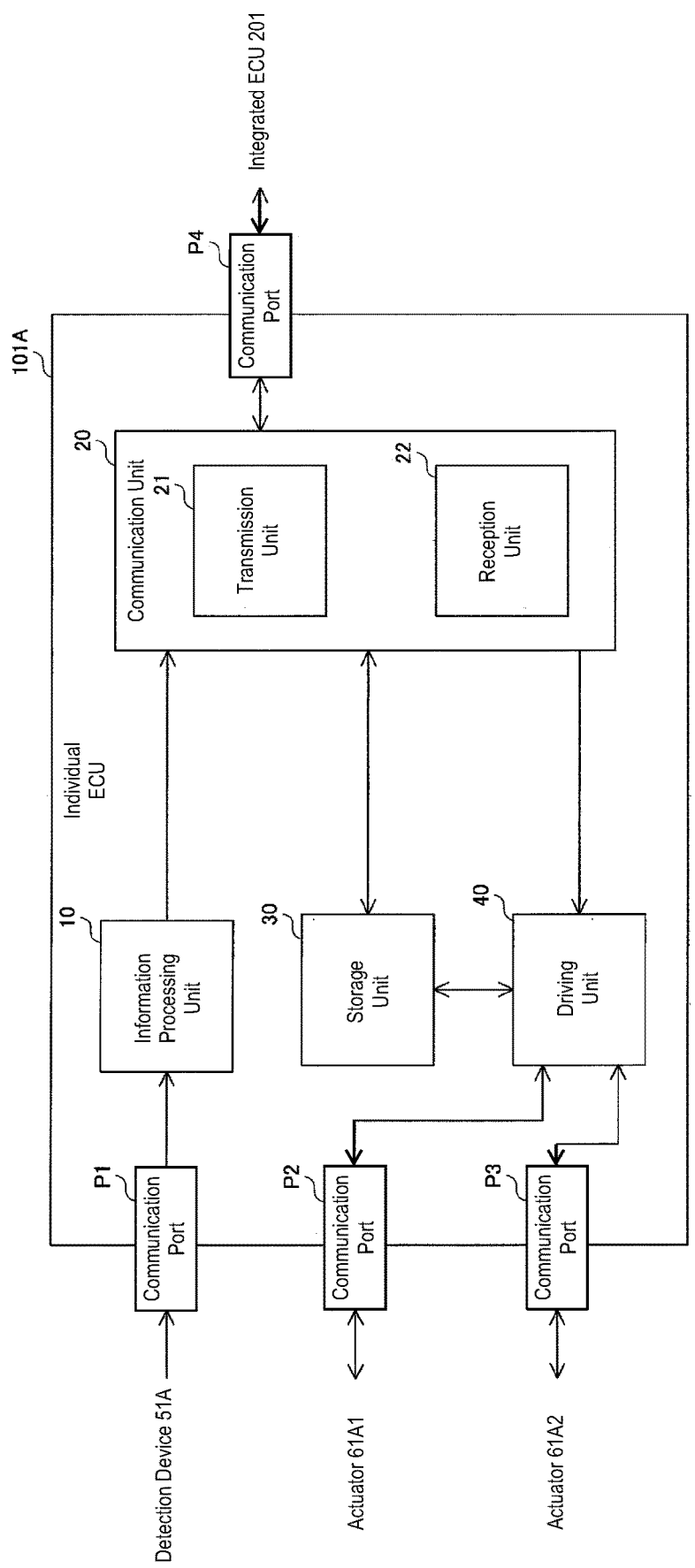
FIG. 2 is a diagram depicting the configuration of an individual ECU according to an embodiment of the present disclosure.

FIG. 2 is a diagram depicting the configuration of an individual ECU according to an embodiment of the present disclosure. FIG. 2 depicts a representative configuration of the individual ECU 101A. Each of the individual ECUs 101B and 101C has the same configuration as the individual ECU 101A. As depicted in FIG. 2, the individual ECU 101A includes an information processing unit 10, a communication unit 20, a storage unit 30, a driving unit (output unit) 40, and communication ports P1, P2, P3, and P4. The communication unit 20 includes a transmission unit 21 and a reception unit 22. The information processing unit 10, the communication unit 20, and the driving unit 40 are realized for example by a processor, such as a CPU (Central Processing Unit) or a DSP (Digital Signal Processor). As one example, the storage unit 30 is a non-volatile memory. Note that the storage unit 30 may be provided outside the individual ECU 101A.

As one example, the communication ports P1, P2, and P3 are terminals to which a cable 5 can be connected, and the communication port P4 is a terminal to which a cable 3 can be connected. The detection device 51, the actuators 61A1 and 61A2, and the integrated ECU 201 are connected to the communication ports P1, P2, P3, and P4, respectively.

The information processing unit 10 receives the detection data transmitted from the detection device 51 via the communication port P1 and outputs the detection data to the communication unit 20. The transmission unit 21 in the communication unit 20 receives the detection data outputted from the information processing unit 10 and transmits the detection data to the integrated ECU 201 via the communication port P4.

The reception unit 22 receives the control information transmitted from the integrated ECU 201 via the communication port P4, and outputs the control information to the driving unit 40. The driving unit 40 generates a driving signal including the control information received from the reception unit 22 or device control information based on the control information, and the generated driving signal is transmitted to the corresponding actuator 61 via the communication port P2 or the communication port P3 to drive the actuator 61. As one example, the device control information is information obtained by converting values, such as control values indicated by the control information, in accordance with predetermined rules. Note that the configuration of the individual ECU 101 is not limited to a configuration for transmitting driving signals, and may have a configuration that transmits other types of signal.

The actuator 61 is a device that supports a lighting function for the lamps of the vehicle 1, a device that supports an opening/closing function for a door of the vehicle 1, or the like. The actuator 61 receives a driving signal transmitted from the individual ECU 101 and operates according to that driving signal. As one example, the actuator 61 transmits a response signal for the driving signal from the individual ECU 101 via the communication port P2 or the communication port P3 to the driving unit 40 of the individual ECU 101.

Integrated ECU

Figure 3:
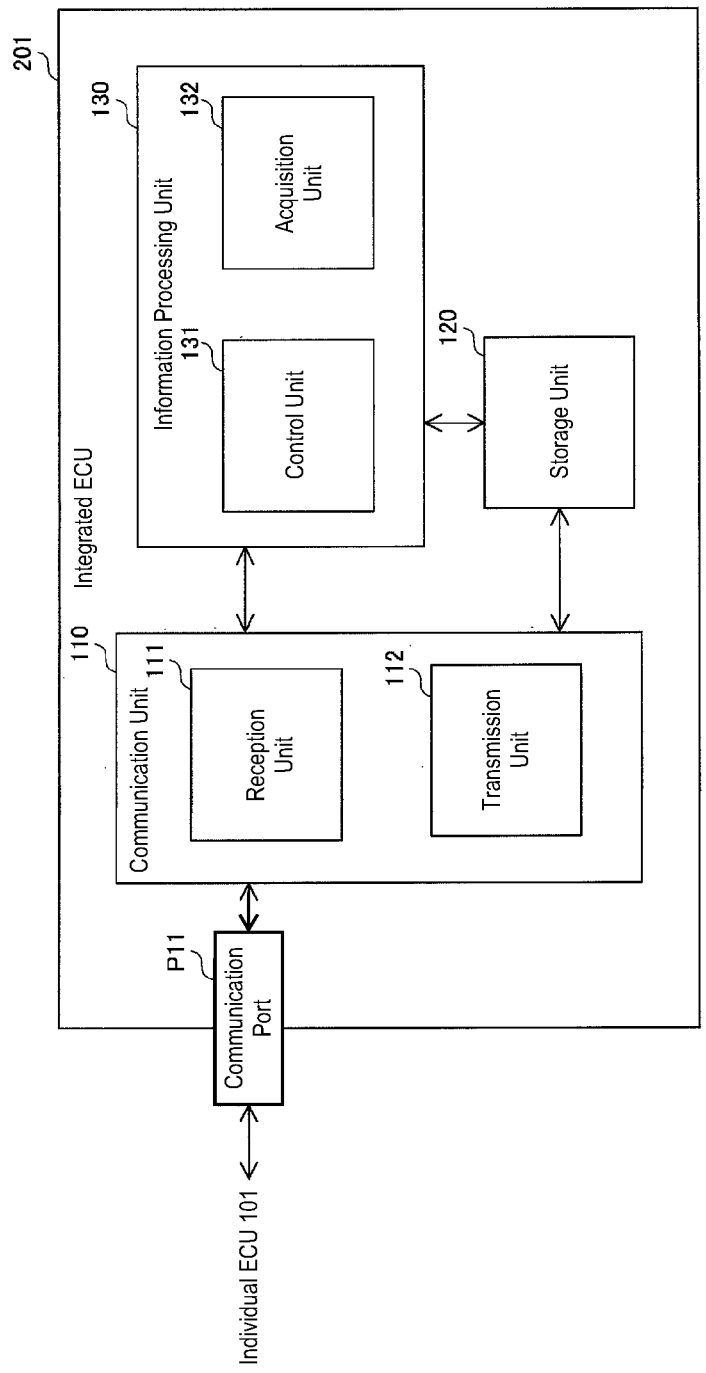
FIG. 3 is a diagram depicting the configuration of an integrated ECU according to an embodiment of the present disclosure.

FIG. 3 is a diagram depicting the configuration of an integrated ECU according to an embodiment of the present disclosure. As depicted in FIG. 3, the integrated ECU 201 includes a communication unit 110, a storage unit 120, an information processing unit 130, and a communication port P11. The communication unit 110 includes a reception unit 111 and a transmission unit 112. The information processing unit 130 includes a control unit 131 and an acquisition unit 132. As one example, the communication unit 110 and the information processing unit 130 are realized by a processor, such as a CPU or a DSP. The storage unit 120 is a non-volatile memory, for example. Note that the storage unit 120 may be provided outside the integrated ECU 201.

As one example, the communication port P11 is a terminal to which the cable 3 can be connected. The individual ECUs 101A, 101B, and 101C are connected to the communication port P11. The reception unit 111 receives the detection data transmitted from the individual ECUs 101 via the communication port P11 and stores the detection data in the storage unit 120. As one example, the control unit 131 in the information processing unit 130 refers to the detection data stored in the storage unit 120 to generate control information for driving an actuator 61 and outputs the generated control information to the transmission unit 112. As one example, the transmission unit 112 receives control information outputted from the control unit 131, stores the control information in a CAN frame, and transmits the CAN frame to the individual ECUs 101 via the communication port 11.

Comparative Example

Tables Stored in Integrated ECU and Each Individual ECU

Figure 4:
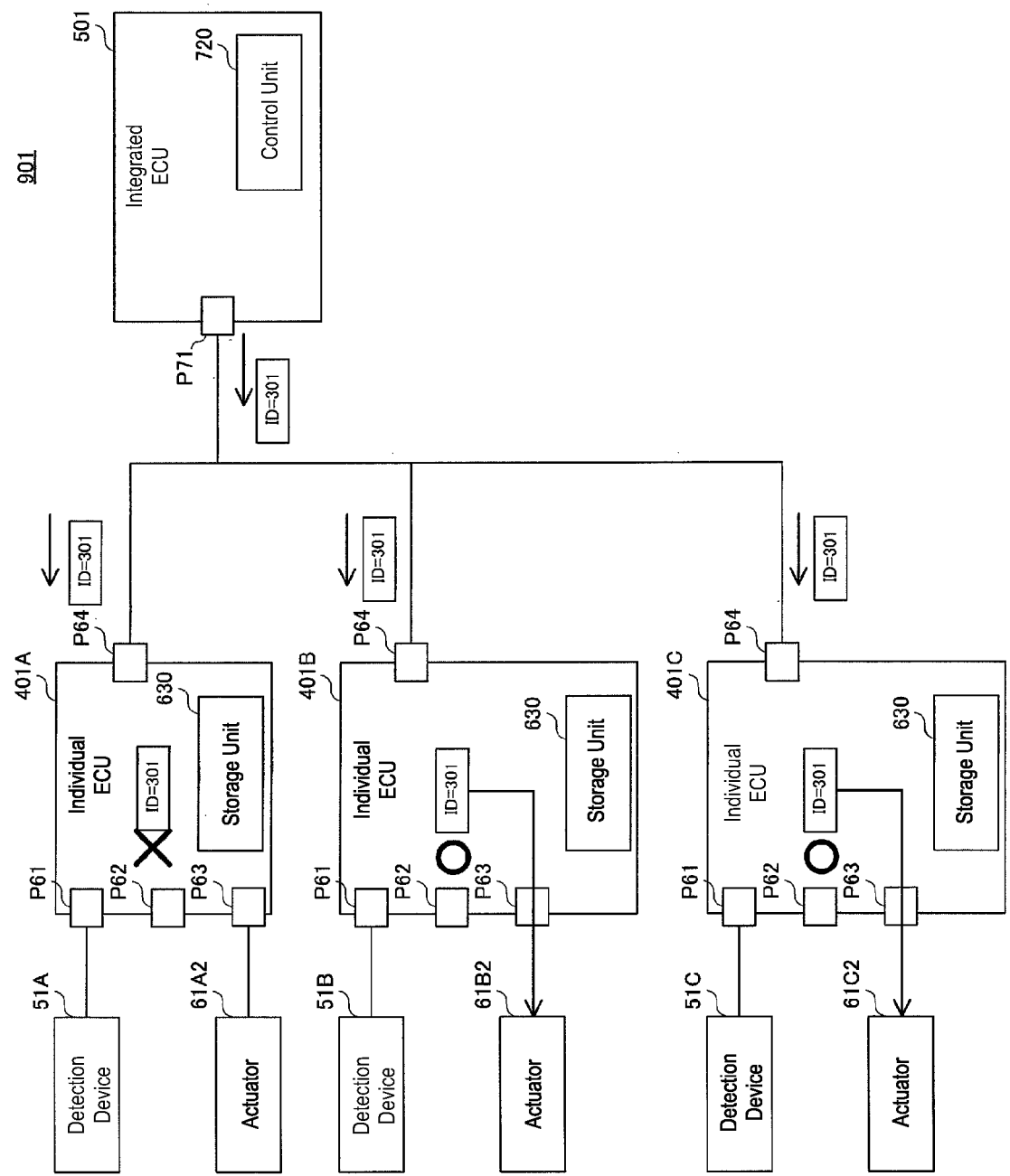
FIG. 4 is a diagram for describing the flow of control information in a vehicle-mounted communication system according to a comparative example.

FIG. 4 is a diagram for describing the flow of control information in a vehicle-mounted communication system according to a comparative example. As depicted in FIG. 4, a vehicle-mounted communication system 901 according to a comparative example includes an integrated ECU 501 and individual ECUs 401A, 401B, and 401C. The individual ECUs 401A, 401B, and 401C are also referred to collectively as the "individual ECUs 401". The integrated ECU 501 has the same configuration as the integrated ECU 201 depicted in FIG. 3. Each individual ECU 401 has the same configuration as the individual ECUs 101 depicted in FIG. 2.

In order to describe the flow of control information in brief, FIG. 4 depicts the storage unit 720 and the communication port P71, which are a part of the configuration of the integrated ECU 501, and the storage unit 630 and the communication ports P61, P62, P63, and P64, which are a part of the configuration of each individual ECU 401. Hereinafter, the communication ports P61, P62, P63, P64, and P71 are also collectively referred to as the "communication ports P". It is assumed here that no device is currently connected to the communication port P62 of each individual ECU 401.

A port table T61 indicating correspondence between the communication port P71 and the device connected to the communication port P71 is stored in the storage unit 720 of the integrated ECU 501. As one example, a function list table T62 indicating a list of functions of each actuator 61 in the vehicle-mounted communication system 901 is stored in the storage unit 720.

FIG. 5 is a diagram depicting an example of a port table stored in an integrated ECU according to the comparative example. In more detail, as depicted in FIG. 5, in the port table T61, "P71" is registered in the "Port" column, "Individual connection" is registered in the "Function" column, "Output" is registered in the "Connected to" column, and "CAN" is registered in the "Communication" column as information indicating that the communication port P71 is connected to the individual ECU 401 and that the communication method for communication with the individual ECU 401 is CAN.

FIG. 6 is a diagram depicting an example of a function list table stored in the integrated ECU according to the comparative example. As depicted on the left side of FIG. 6, the function list table T62 indicates, for example, an ID (Identification) for the function of each actuator 61 in the vehicle-mounted communication system 901. As a detailed example, the function list table T62 indicates that the ID corresponding to the door opening/closing function is "301".

Returning to FIG. 4, a port table T51 indicating the correspondence between the plurality of communication ports P of an individual ECU 401 and the devices connected to the respective communication ports P is stored in the storage unit 630 of that individual ECU 401. A function list table T52 indicating a list of functions of that individual ECU 401 is also stored in the storage unit 630.

Figure 7:
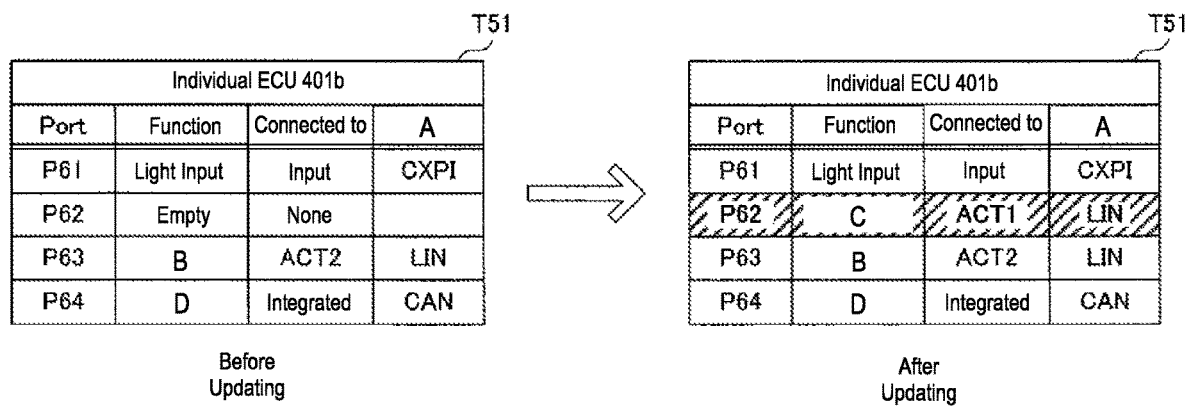
FIG. 7 is a diagram depicting an example of a port table stored in an individual ECU according to the comparative example.

FIG. 7 is a diagram depicting an example of a port table stored in an individual ECU according to the comparative example. FIG. 7 depicts a representative example of a port table T51 stored in the individual ECU 401B. As depicted on the left in FIG. 7, as a detail example, the port table T51 indicates that the communication port P61 is connected to the detection device 51 for measuring an on or off state of lamps, and the communication method for communication with the detection device 51 is CXPI. As one example, the port table T51 indicates that the communication port P62 is a communication port used when a new device is added (hereinafter also referred to as an "expansion port").

Figure 8:
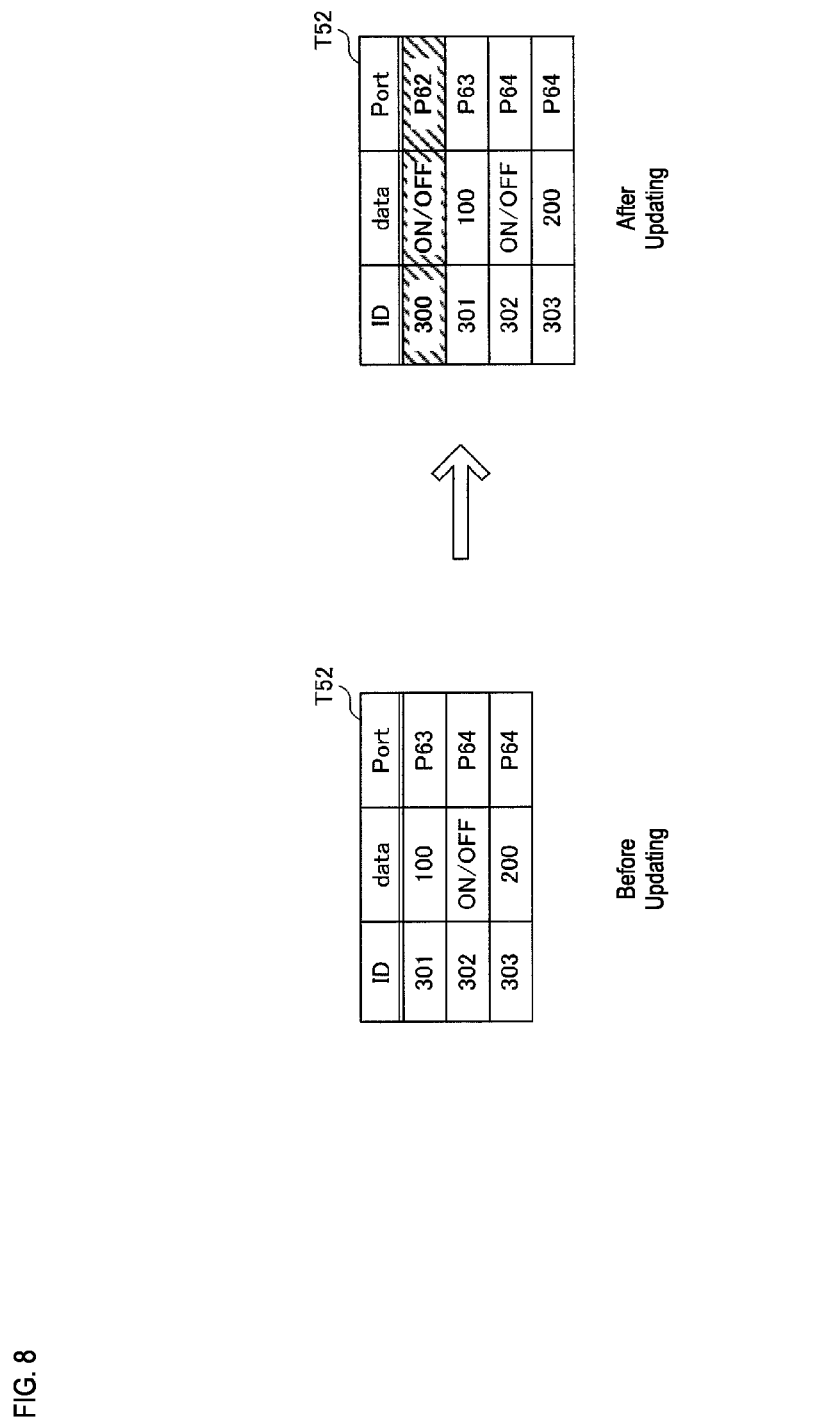
FIG. 8 is a diagram depicting an example of a function list table stored in an individual ECU according to the comparative example.

FIG. 8 is a diagram depicting an example of a function list table stored in an individual ECU according to the comparative example. FIG. 8 depicts a representative example of a function list table T52 stored in the individual ECU 401B. As depicted on the left side of FIG. 8, as one example, the function list table T52 indicates that control information indicating a numerical value "100" as a duty ratio is transmitted to or received from a device with a function corresponding to the ID "301" and that the communication port P that is to output this control information, or device control information based on this control information, is the communication port P63.

Transmission of Driving Signal

Returning to FIG. 4, it is assumed here that the integrated ECU 501 generates control information for changing the opened/closed state of the left and right doors of the vehicle 1. It is also assumed that the actuator 61B2 connected to the communication port P63 of the individual ECU 401B is a device that supports the opening/closing function of the left door of the vehicle 1. It is further assumed that the actuator 61C2 connected to the communication port P63 of the individual ECU 401C is a device that supports the opening/closing function of the right door of the vehicle 1.

In this case, the integrated ECU 501 refers for example to the function list table T62 depicted on the left side of FIG. 6, and stores, in a CAN frame, ID information indicating the ID "301" corresponding to the door opening/closing function together with control information indicating the duty ratio when changing the door opened/closed state. The integrated ECU 501 then transmits this CAN frame via the communication port P71 to the plurality of individual ECUs 401.

Each individual ECU 401 receives the CAN frame transmitted from the integrated ECU 501 via the communication port P64 and checks the ID indicated by the ID information stored in the received CAN frame. When, as one example, the ID is not included in the function list table T52 depicted in FIG. 8, the individual ECU 401 discards the CAN frame. On the other hand, when, for example, the ID is included in the function list table T52, the individual ECU 401 acquires the control information stored in the CAN frame and generates a driving signal including the control information or device control information based on the control information.

In more detail, the individual ECU 401 refers again to the function list table T52 and specifies, as one example, the communication port P63 corresponding to the ID "301" as the communication port P to output the driving signal. The individual ECU 401 also refers to the port table T51 depicted on the left side of FIG. 7 and specifies "LIN" corresponding to the communication port P63 as the communication method to be used when outputting the driving signal. The individual ECU 401 then stores the control information or the device control information in a frame with a format conforming to the LIN standard, for example, and generates a driving signal which includes the frame and conforming to a modulation method according to LIN standard. The individual ECU 401 then outputs the generated driving signal to the communication port P63.

Here, it is assumed that the function list table T52 stored in the individual ECU 401A does not include the ID "301", and the function list table T52 stored in the individual ECUs 401B and 401C include the ID "301". In this case, the individual ECU 401B transmits a driving signal via the communication port P63 to the actuator 61B2. As a result, the opened/closed state of the left door of the vehicle 1 is changed. The individual ECU 401C also transmits a driving signal via the communication port P63 to the actuator 61C2. As a result, the opened/closed state of the right door of the vehicle 1 is changed.

Updating of Table When New Device is Added

As one example, it is assumed here that a user connects a new actuator 61 to the communication port P62, which is the expansion port of the individual ECU 401B, in the vehicle-mounted communication system 901 according to the comparative example. As one example, the new actuator 61 is a device that supports a window opening/closing function. In this case, as depicted on the right side of FIG. 6, the user updates the function list table T62 by adding an ID and a function corresponding to the new actuator 61, for example, to the function list table T62 stored in the integrated ECU 501.

Also, in this case, as depicted on the right side of FIG. 7, the user updates the port table T51 by adding information indicating that the actuator 61, which supports the window opening/closing function, has been connected, the communication method for communication with the actuator 61 is "LIN", and the like to a location corresponding to the communication port P62 in the port table T51 stored in the individual ECU 401B.

In this case, as depicted on the right side of FIG. 8, the user updates the function list table T52 by adding, for example, the ID "300" corresponding to the function of the new actuator 61, the content of the data to be transmitted or received, and the communication port P62 to which the actuator 61 is connected to the function list table T52 stored in the individual ECU $01B.

As described above, in the vehicle-mounted communication system 901 according to the comparative example, both the integrated ECU 501 and the individual ECUs 401 store a table indicating the correspondence between the plurality of communication ports and the devices connected to such plurality of communication ports. This means that when a new actuator 61 is added, it is necessary to update the tables in both the integrated ECU 501 and the individual ECUs 401, which increases the time taken by user tasks.

For this reason, in the vehicle-mounted communication system 301 according to the embodiment of the present disclosure, the integrated ECU 201 stores information indicating the correspondence between the plurality of communication ports in each individual ECU 101 and the devices connected to those pluralities of communication ports. By doing so, addition of functions and the like in the vehicle-mounted communication system 301 becomes easier, and it is possible to more flexibly support the addition of functions. The detailed configuration for doing this will now be described.

Figure 9:
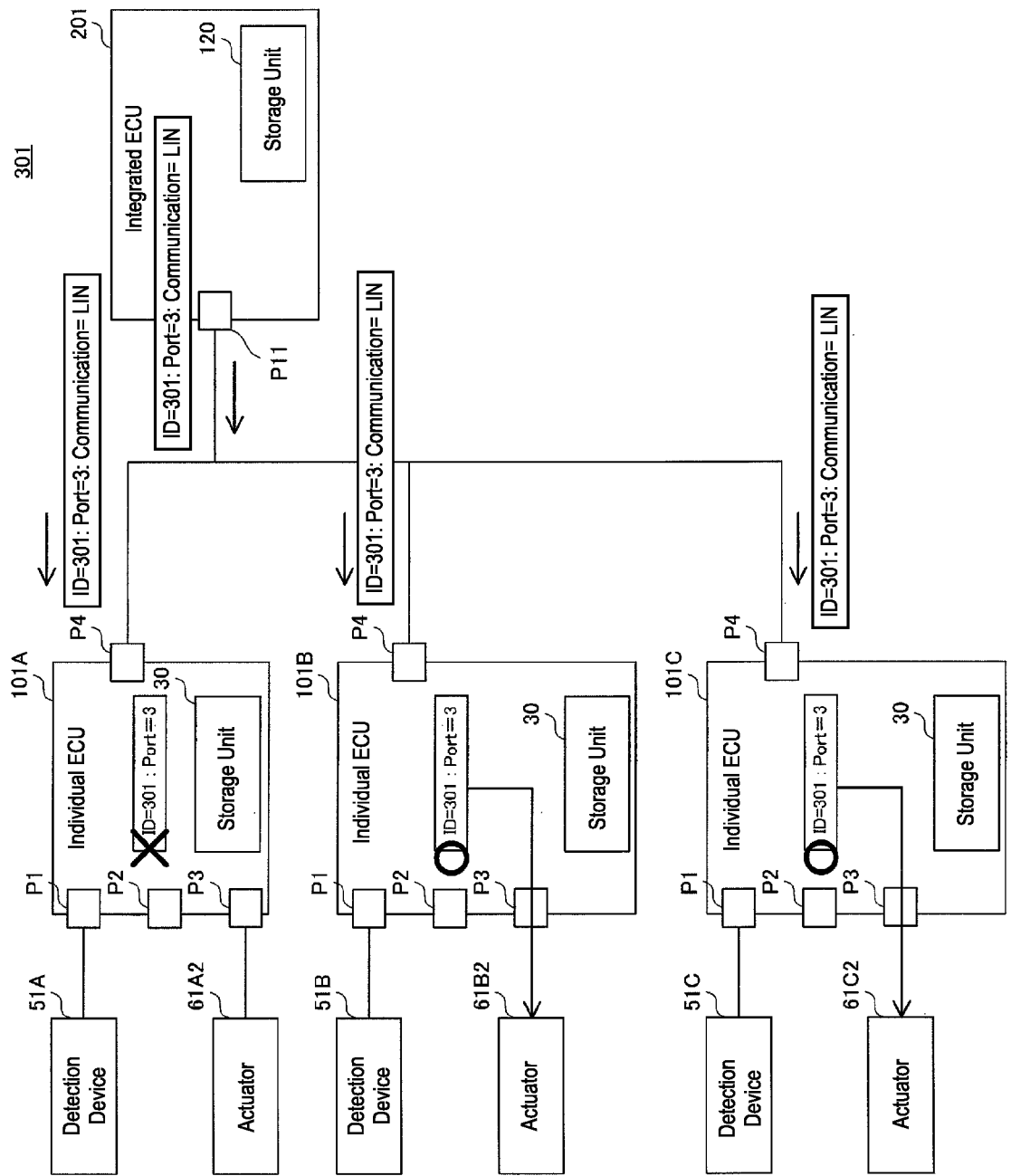
FIG. 9 is a diagram for describing the flow of control information in the vehicle-mounted communication system according to an embodiment of the present disclosure.

Detailed Description of the Vehicle-Mounted Communication System According to the Embodiment of the Present Disclosure Tables Stored in Integrated ECU and Each Individual ECU FIG. 9 is a diagram for describing the flow of control information in the vehicle-mounted communication system according to the embodiment of the present disclosure. To briefly describe the flow of control information, the storage unit 120 and the communication port P11, which are part of the configuration of the integrated ECU 201, and the storage unit 30 and the communication port P1, P2, P3, and P4, which are part of the configuration of each individual ECU 101, are depicted in FIG. 9. Hereinafter, the respective communication ports P1, P2, P3, P4, and P11 are also collectively referred to as the "communication ports P". Here, it is assumed that no device is currently connected to the communication port P2 of each individual ECU 101.

As depicted in FIG. 9, the storage unit 120 of the integrated ECU 201 stores a port table T21 including information relating to the plurality of communication ports P in the vehicle-mounted communication system 301. The port table T21 includes port information indicating the correspondence between the plurality of communication ports P in each individual ECU 101 and devices connected to those pluralities of communication ports P. In addition, the port table T21 further includes communication method information indicating correspondence between the plurality of communication ports P in each individual ECU 101 and the communication method to be used when the individual ECU 101 outputs control information or device control information to a device via any one of the plurality of communication ports P.

FIG. 10 is a diagram depicting one example of a port table stored in the integrated ECU according to the embodiment of the present disclosure. The port information indicates the functions of the devices connected to each of the plurality of communication ports P. In more detail, as depicted on the left side in FIG. 10, like the port table T61 depicted in FIG. 5, as one example the port table T21 indicates the correspondence between the communication port P11 in the integrated ECU 201, the function of the device connected to the communication port P11, and the communication method used for communication with the device connected to the communication port P11.

Like the port table T51 depicted on the left in FIG. 7, the port table T21 further includes, for each individual ECU 101, the correspondence between the plurality of communication ports P, the functions of the devices connected to the plurality of communication ports P, and the communication methods to be used for communication with the devices connected to the plurality of communication ports P. FIG. 10 depicts a representative example of detailed information relating to the plurality of communication ports P in the individual ECU 101B.

Figures 11, 12, 13:
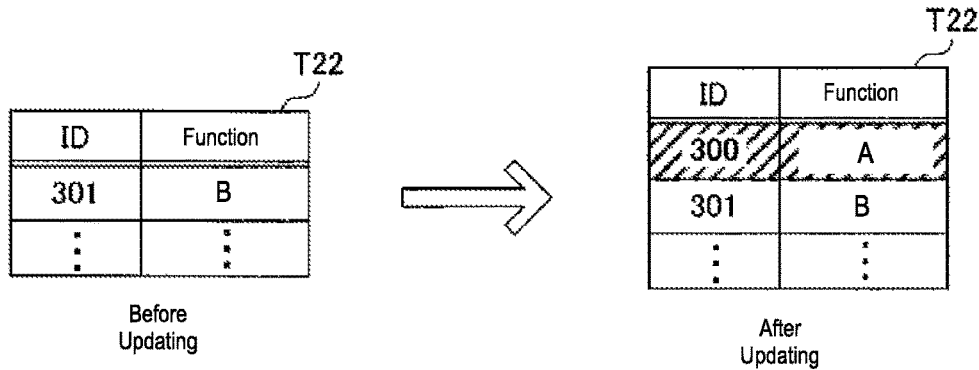
FIG. 11 is a diagram depicting one example of a function list table stored in the integrated ECU according to an embodiment of the present disclosure.
FIG. 12 is a diagram depicting one example of a port table stored in an individual ECU according to an embodiment of the present disclosure.
FIG. 13 is a diagram depicting an example of a function list table stored in an individual ECU according to the embodiment of the present disclosure.

A function list table T22 indicating a list of functions of each actuator 61 in the vehicle-mounted communication system 301 is also stored in the storage unit 120 of the integrated ECU 201. FIG. 11 is a diagram depicting one example of a function list table stored in the integrated ECU according to the embodiment of the present disclosure. Since the function list table T22 on the left in FIG. 11 is similar to the function list table T62 depicted on the left side of FIG. 6, detailed description thereof will not be repeated here.

Returning to FIG. 9, the storage unit 30 in each individual ECU 101 stores for example a port table T11 indicating the communication port P4 to which the integrated ECU 201 is connected, out of the plurality of communication ports P of that individual ECU 101. The port table T11 is an example of the port information in an individual ECU 101. The storage unit 30 also stores a function list table T12 depicting a list of the individual ECUs 101 and functions at the individual ECUs 101. This function list table T12 is one example of function information at the individual ECUs 101.

FIG. 12 is a diagram depicting one example of a port table stored in an individual ECU according to an embodiment of the present disclosure. FIG. 12 depicts a representative port table T11 stored in the individual ECU 101B.

The port information of the individual ECU 101 is composed of the identification information of the communication port P to which the integrated ECU 201 is connected, the functions of the integrated ECU 201, and the communication method for communication with the integrated ECU 201. That is, the port table T11 indicates only the port number, functions, connected devices, and communication method. In more detail, as depicted in FIG. 12, the port table T11 indicates for example that the integrated ECU 201 is connected to the communication port P4 and the communication method for communication with the integrated ECU 201 is CAN.

FIG. 13 is a diagram depicting an example of a function list table stored in an individual ECU according to the embodiment of the present disclosure. FIG. 13 depicts a representative function list table T12 stored in the individual ECU 101B. The storage unit 30 further stores function information indicating a list of identification information of functions of the individual ECUs 101. In more detail, as depicted in FIG. 13, the function list table T12 indicates for example a list of functions of the individual ECU 101B.

Note that each individual ECU 101 is not limited to be configured to store both the port table T11 and the function list table T12 and may be configured not to store at least one of the port table T11 and the function list table T12.

Transmission of Driving Signal

In the integrated ECU 201, the transmission unit 112 further includes identification information of the function of the device to be controlled in the CAN frame and transmits the frame to the individual ECUs 101. At the individual ECUs 101, the driving unit 40 determines, based on the identification information of the function of the device to be controlled which is included in the CAN frame received by the reception unit 22, whether to output control information or device control information to the communication port P indicated by the output destination information.

In more detail, as depicted in FIGS. 3 and 9, it is assumed that the control unit 131 in the integrated ECU 201 generates control information for changing the opened/closed state of the left and right doors of the vehicle 1. It is assumed that the actuator 61B2 connected to the communication port P3 of the individual ECU 101B is a device that supports the opening/closing function of the left door in the vehicle 1. It is also assumed that the actuator 61C2 connected to the communication port P3 of the individual ECU 101C is a device that supports the opening/closing function of the right door of the vehicle 1.

In this case, the acquisition unit 132 in the integrated ECU 201 refers to the port table T21 depicted on the left side in FIG. 10 and specifies the communication port P3 corresponding to the door opening/closing function as the communication port P to be used as the output destination of the device control information based on the control information or device control information for changing the opened/closed state of a door. The acquisition unit 132 also refers to the port table T21 and specifies "LIN" as the communication method to be used when the individual ECU 101 transmits control information or device control information to the device.

The acquisition unit 132 also refers to the function list table T22 depicted in FIG. 11 and specifies "301" as the ID corresponding to the door opening/closing function. The acquisition unit 132 then outputs ID information indicating the specified ID, output destination information indicating the specified communication port P3, and setting information indicating the specified communication method "LIN" to the control unit 131.

The control unit 131 outputs the generated control information, and also the ID information, the output destination information and the setting information received from the acquisition unit 132 to the transmission unit 112. As one example, the transmission unit 112 stores the ID information, the output destination information, and the setting information received from the control unit 131 in a data region of a CAN frame together with the control information received from the control unit 131. The transmission unit 112 then transmits the CAN frame via the communication port 11 to the plurality of individual ECUs 101.

As depicted in FIGS. 2 and 9, the reception unit 22 in each individual ECU 101 receives the CAN frame transmitted from the integrated ECU 201 via the communication port P4 and checks the ID indicated by the ID information stored in the received CAN frame. When, for example, the ID is not included in the function list table T12 depicted in FIG. 13, the reception unit 22 discards the CAN frame. On the other hand, when the ID is included in the function list table T12, the reception unit 22 acquires the control information, the output destination information, and the setting information stored in the CAN frame and outputs the acquired information to the driving unit 40.

The driving unit 40 receives control information from the reception unit 22 and generates a driving signal including the control information or device control information based on that control information. In more detail, the driving unit 40 stores the control information or the device control information in a frame with a format conforming to the standard of the communication method indicated by the setting information received from the reception unit 22, for example. The driving unit 40 then generates a driving signal that includes the frame and is modulated according to the modulation method conforming to the standard indicated, and outputs the generated driving signal to the communication port P3 indicated by the output destination information received from the reception unit 22. The actuator 61 connected to the communication port P3 receives the driving signal transmitted from the driving unit 40 via the communication port P3, and operates according to the driving signal.

Table Updating When New Device is Added

When a device is newly connected to a communication port P to which a device has not been connected, the information stored by each individual ECU 101 is not updated and information relating to the device in question is added to the port information in the integrated ECU 201.

As one example, for the vehicle-mounted communication system 301 according to the embodiment of the present disclosure, it is assumed that the user has connected a new actuator 61 to the communication port P2 that is an expansion port of the individual ECU 101B, for example. As one example, the new actuator 61 is a device that supports a window opening/closing function. In this case, as depicted on the right side of FIG. 10, the user updates the port table T21 by adding the function of the new actuator 61, the communication method to be used for communication with the new actuator 61, and the like to a location corresponding to the communication port P2 of the individual ECU 101B in the port table T21 stored in the integrated ECU 201.

In this case, as depicted on the right side of FIG. 11 for example, the integrated ECU 201 adds the function of the new actuator 61 and a freely chosen ID to the function list table T22 and also notifies the individual ECU 101B of this ID. As one example, the individual ECU 101B receives a notification from the integrated ECU 201 and newly registers the ID in the function list table T12 depicted in FIG. 13.

As described above, in the vehicle-mounted communication system 301, the integrated ECU 201 collectively manages port information indicating the correspondence between the plurality of communication ports P included in the individual ECUs 101 and the devices connected to the plurality of communication ports P. For this reason, when a new actuator 61 is added, it is sufficient to update the table stored in the integrated ECU 201, and there is no need to update the tables in both the integrated ECU 501 and the individual ECUs 401 as in the vehicle-mounted communication system 901 according to the comparative example.

Note that the updating of the table can be performed OTA (Over The Air), for example. That is, the content of the table can be updated using wireless communication, by the user operating a terminal or the like. It is common for the integrated ECU 201 to have high performance, and in many cases it will be possible to update the table by OTA in this way. On the other hand, the individual ECUs 101 often have lower performance than the integrated ECU 201, and in many cases it will not be possible to update their tables by OTA.

On the other hand, as described above, when a new actuator 61 is added, since it is sufficient to update the table stored in the integrated ECU 201, as one example it is possible to update the table more easily using OTA. It is also possible to update the table stored in the integrated ECU 201 using a method aside from OTA.

The port table T21 can be updated using an apparatus that can be connected by wires to the vehicle in which the integrated ECU 201 is mounted. As one example, the user may update the table stored in the integrated ECU 201 by connecting a diagnostic tool for diagnosis of an apparatus or the like to the integrated ECU 201 using wires and then operating the diagnostic tool.

Note that the port table T21 stored in the integrated ECU 201 is not limited to the table depicted in FIG. 10. As one example, a table including the port information described earlier and a table including the communication method information described earlier may be separately stored in place of the port table T21 in the storage unit 120 of the integrated ECU 201.

It is not necessary for the port table T21 to include the communication method information. In this case, the transmission unit 112 in the integrated ECU 201 transmits, for example, a CAN frame storing the control information, the ID information, and the output destination information to the individual ECU 101. As one example, the port table T51 depicted in FIG. 7 and the function list table T52 depicted in FIG. 8 are stored in the storage unit 30 of an individual ECU 101. The driving unit 40 in the individual ECU 101 refers to the function list table T52 to specify the communication port P corresponding to the ID indicated by the ID information stored in the CAN frame received from the integrated ECU 201. The driving unit 40 also refers to the port table T51 to specify the communication method corresponding to the specified communication port P. The driving unit 40 then generates a driving signal according to the specified communication method and outputs the generated driving signal to the communication port P.

Flow of Operation

Each apparatus in the vehicle-mounted communication system according to the embodiment of the present disclosure is equipped with a computer including a memory. A computation processing unit, such as a CPU, in the computer reads out a program including some or all of the steps in the flowchart and sequence described below from the memory and executes the program. The programs used in the plurality of apparatuses can each be installed from the outside. The programs in the plurality of devices are distributed having been stored on recording media.

Transmission of Control Information by Integrated ECU

Figure 14:
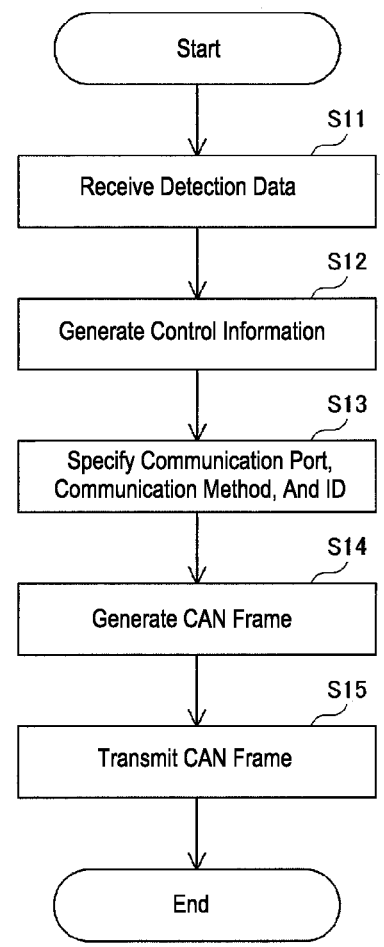
FIG. 14 is a flowchart defining one example of an operation procedure when the integrated ECU according to an embodiment of the present disclosure transmits a frame storing control information to individual ECUs.

FIG. 14 is a flowchart defining one example of an operation procedure when the integrated ECU according to an embodiment of the present disclosure transmits a frame, in which control information is stored, to the individual ECUs.

As depicted in FIG. 14, first, when the integrated ECU 201 has received detection data transmitted from an individual ECU 101 (step S11), the integrated ECU 201 generates control information for controlling the device connected to that individual ECU 101 based on the received detection data (step S12).

Next, the integrated ECU 201 refers to the port table T21 depicted in FIG. 10 and specifies a communication port P, which is the output destination of a driving signal including the control information or device control information based on the control information, and the communication method to be used when transmitting the driving signal to a device. The integrated ECU 201 also refers to the function list table T22 depicted in FIG. 11 and specifies the ID corresponding to the function of the device to be controlled (step S13).

Next, the integrated ECU 201 generates a CAN frame which includes, together with the generated control information, output destination information indicating the specified communication port P, setting information indicating the specified communication method, and ID information indicating the specified ID (step S14). After this, the integrated ECU 201 transmits the generated CAN frame to the plurality of individual ECUs 101 (step S15).

Outputting of Driving Signal by Individual ECU

Figure 15:
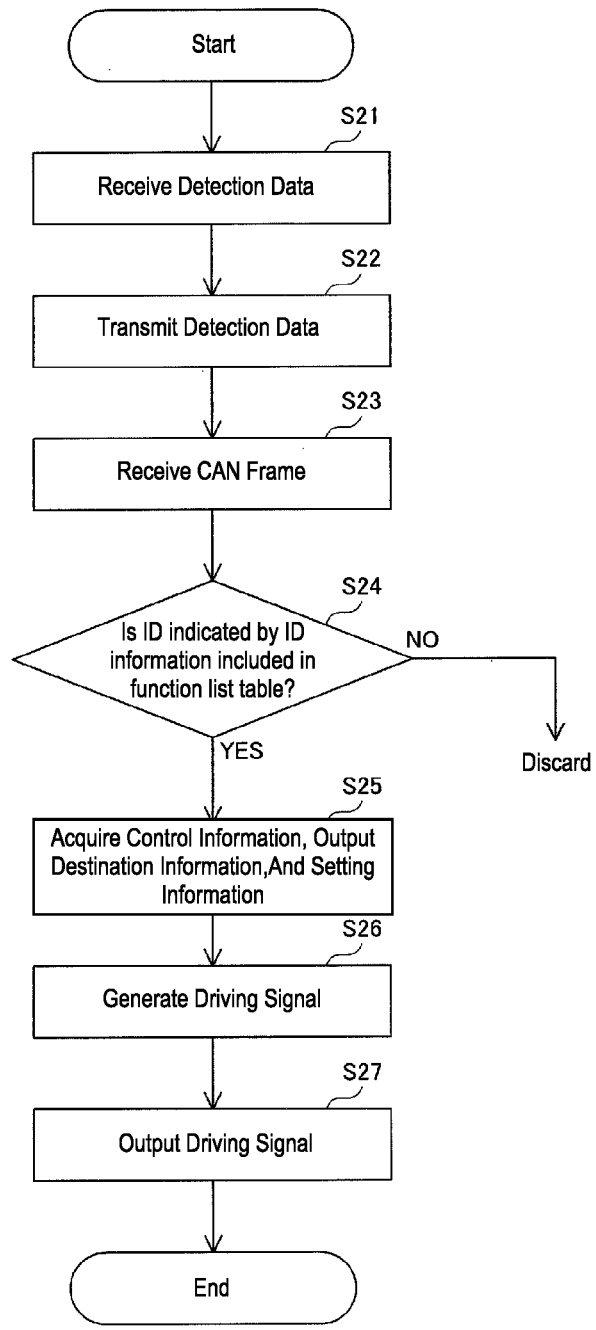
FIG. 15 is a flowchart defining one example of an operation procedure when an individual ECU according to the embodiment of the present disclosure outputs a driving signal.

FIG. 15 is a flowchart defining one example of an operation procedure when an individual ECU according to the embodiment of the present disclosure outputs a driving signal.

As depicted in FIG. 15, first, when an individual ECU 101 has received detection data transmitted from the detection device 51 connected to that individual ECU 101 (step S21), the individual ECU 101 transmits the received detection data via the communication port P4 to the integrated ECU 201 (step S22).

Next, when a CAN frame including control information that has been transmitted from the integrated ECU 201 is received (step S23), the individual ECU 101 checks whether the ID indicated by the ID information included in the received CAN frame is included in the function list table T12 depicted in FIG. 13 (step S24).

Next, when the ID is not included in the function list table T12 ("NO" in step S24), the individual ECU 101 discards the CAN frame, for example. On the other hand, when the ID is included in the function list table T12 ("YES" in step S24), the individual ECU 101 acquires the control information, the output destination information, and the setting information included in the CAN frame (step S25).

Next, the individual ECU 101 generates a driving signal including the acquired control information or device control information based on that control information (step S26), and outputs the generated driving signal to the communication port P indicated by the output destination information with the communication method indicated by the setting information (step S27).

Communication Processing in Vehicle-Mounted Communication System

Figure 16:
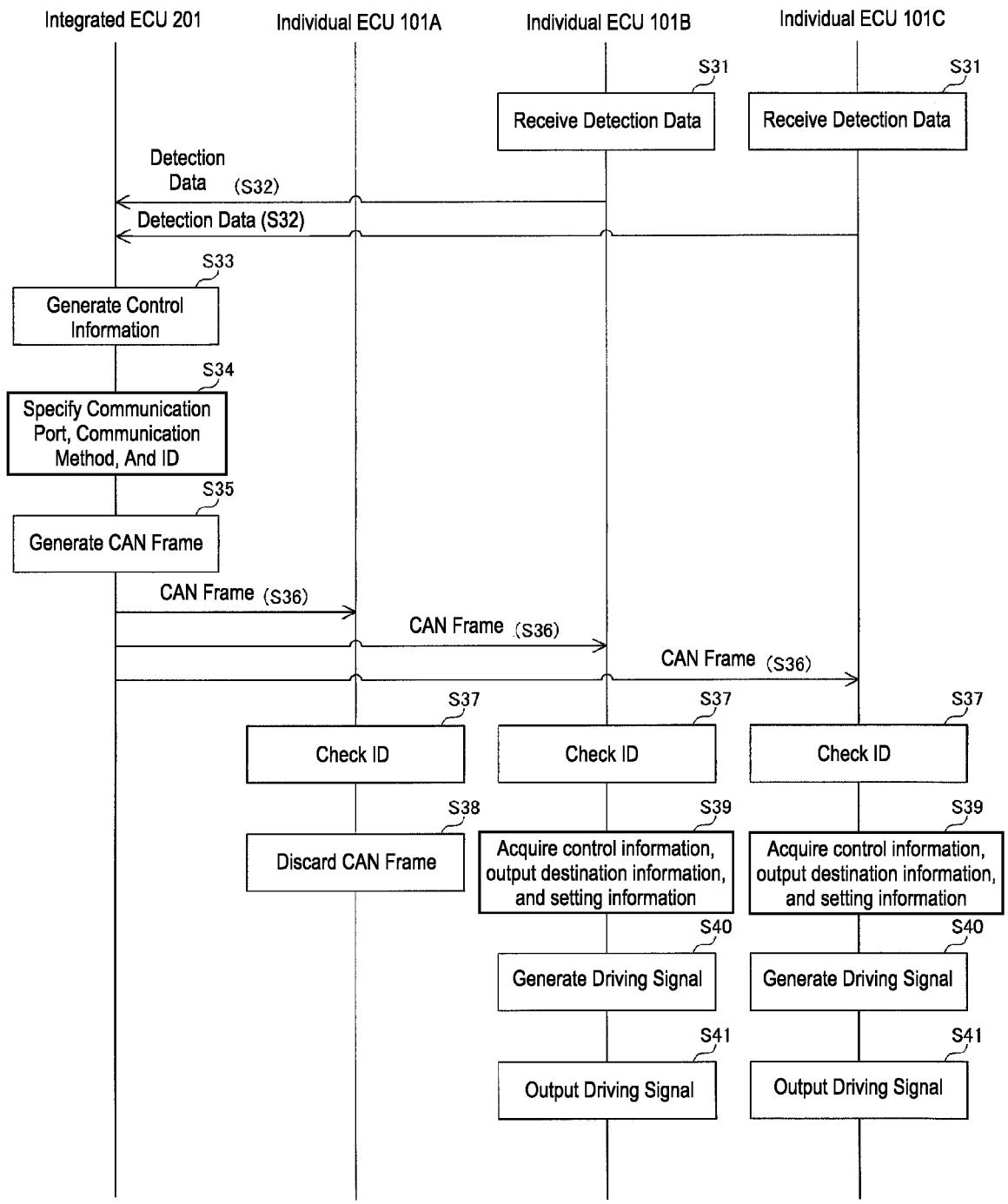
FIG. 16 is a diagram depicting an example sequence of communication processing in the vehicle-mounted communication system according to an embodiment of the present disclosure.

FIG. 16 is a diagram depicting an example sequence of communication processing in the vehicle-mounted communication system according to an embodiment of the present disclosure.

As depicted in FIG. 16, first, as one example, on receiving detection data transmitted from a detection device 51 connected thereto (step S31), each of the individual ECUs 101B and 101C transmits the received detection data via the communication port P4 to the integrated ECU 201 (step S32).

Next, on receiving the detection data transmitted from both of the individual ECUs 101B and 101C, as one example the integrated ECU 201 generates control information for controlling the device connected to the individual ECU 101B and for controlling the device connected to the individual ECU 101C based on the received plurality of pieces of detection data (step S33).

Next, the integrated ECU 201 refers to the port table T21 depicted in FIG. 10 and specifies the communication port P to be used as the output destination of a driving signal including the control information or device control information based on the control information and also specifies the communication method to be used when transmitting the driving signal to the device. The integrated ECU 201 also refers to the function list table T22 depicted in FIG. 11 and specifies the ID corresponding to the function of the device to be controlled (step S343).

Next, the integrated ECU 201 generates a CAN frame which includes, together with the generated control information, output destination information indicating the specified communication port P, setting information indicating the specified communication method, and ID information indicating the specified ID (step S35). The integrated ECU 201 then transmits the generated CAN frame to the individual ECUs 101A, 101B, and 101C (step S36).

Next, on receiving the CAN frame including the control information transmitted from the integrated ECU 201, the individual ECUs 101A, 101B, and 101C check whether the ID indicated by the ID information included in the received CAN frame is included in the function list table T12 depicted in FIG. 13 (step S37).

Here, it is assumed that the ID is not included in the function list table T52 stored in the individual ECU 101A. In this case, the individual ECU 101A discards the received CAN frame, for example (step S38).

On the other hand, it is assumed that the ID in question is included in the function list table T52 stored in the individual ECUs 101B and 101C. In this case, the individual ECUs 101B and 101C each acquire the control information, the output destination information, and the setting information included in the received CAN frame (step S39).

Next, the individual ECUs 101B and 101C each generate a driving signal including the acquired control information or device control information based on the control information (step S39), and output the generated driving signal to the communication port P indicated by the output destination information with the communication method indicated by the setting information (step S40).

As a network configuration that can flexibly support addition of functions and the like in a vehicle-mounted communication system, a network configuration in which an integrated vehicle-mounted apparatus and a plurality of peripheral vehicle-mounted apparatuses connected to the integrated vehicle-mounted apparatus are included and the integrated vehicle-mounted apparatus controls the driving of devices by the peripheral vehicle-mounted apparatuses has been developed. In this network configuration, as one example, the integrated vehicle-mounted apparatus and each of the peripheral vehicle-mounted apparatuses stores a table indicating the correspondence between the plurality of communication ports in a peripheral vehicle-mounted apparatus and devices connected to this plurality of communication ports.

However, with this configuration, when a new device is added to a peripheral vehicle-mounted apparatus, it is necessary to update the tables in both the integrated vehicle-mounted apparatus and the peripheral vehicle-mounted apparatuses, resulting in the problem of an increase in the time taken by user tasks. For this reason, there is demand for a technology for flexibly supporting the addition of functions and the like in a vehicle-mounted communication system.

On the other hand, by using the integrated ECU 201, the individual ECUs 101, the vehicle-mounted communication system 301, and the communication control method according to the embodiments of the present disclosure, it is possible to more flexibly support the addition of functions and the like in the vehicle-mounted communication system 301 compared to the above configuration and method.

All features of the embodiments disclosed here are exemplary and should not be regarded as limitations on the present invention. The scope of the present invention is indicated by the range of the patent claims, not the description given above, and is intended to include all changes within the meaning and scope of the patent claims and their equivalents.

The above description also includes the features given in the following appendices.

Appendix 1

A vehicle-mounted apparatus that is connected to a plurality of peripheral vehicle-mounted apparatuses, wherein each of the peripheral vehicle-mounted apparatuses includes a plurality of communication ports, and the vehicle-mounted apparatus includes: a storage unit configured to store port information indicating correspondence between the plurality of communication ports in each peripheral vehicle-mounted apparatus and devices connected to the communication ports; and a transmission unit configured to include, based on the port information stored in the storage unit, output destination information indicating a communication port, out of the plurality of communication ports, to be used as an output destination of one of control information for controlling a device and device control information based on the control information in a frame together with the control information, and transmit the frame to the peripheral vehicle-mounted apparatuses, wherein the port information further indicates functions of the devices connected to the communication ports and is updatable using OTA (Over The Air).

Appendix 2

A vehicle-mounted apparatus including a plurality of communication ports, including: a reception unit configured to receive a frame including control information for controlling a device connected to a communication port and output destination information indicating a communication port to be used as an output destination of one of the control information and device control information based on the control information; and an output unit configured to output the control information, or the device control information based on the control information, included in the frame received by the reception unit to the communication port indicated by the output destination information, wherein the vehicle-mounted apparatus further includes a storage unit configured to store information indicating a list of functions of the vehicle-mounted apparatus.

Appendix 3

A vehicle-mounted communication system including: an integrated vehicle-mounted apparatus; and a plurality of peripheral vehicle-mounted apparatuses which include a plurality of communication ports and are connected to the integrated vehicle-mounted apparatus, wherein the integrated vehicle-mounted apparatus stores port information indicating correspondence between the plurality of communication ports in the peripheral vehicle-mounted apparatuses and devices connected to the communication ports, the integrated vehicle-mounted apparatus includes, based on the port information, output destination information indicating a communication port, out of the plurality of communication ports, to be used as an output destination of one of control information for controlling a device and device control information based on the control information in a frame together with the control information, and transmits the frame to the peripheral vehicle-mounted apparatuses, a peripheral vehicle-mounted apparatus receives the frame transmitted from the integrated vehicle-mounted apparatus and outputs the control information included in the received frame or the device control information based on the control information to the communication port indicated by the output destination information, the port information further indicates functions of the devices connected to the communication ports, and is updatable using OTA (Over The Air), and each peripheral vehicle-mounted apparatus stores information indicating a list of functions of the peripheral vehicle-mounted apparatus.

The invention claimed is:

1. A vehicle-mounted apparatus that is connected to a plurality of peripheral vehicle-mounted apparatuses, wherein each of the peripheral vehicle-mounted apparatuses includes a plurality of communication ports, the vehicle-mounted apparatus comprising:
a storage unit configured to store port information indicating correspondence between the plurality of communication ports in each peripheral vehicle-mounted apparatus and a function of each device connected to the communication ports; and
a transmission unit configured to process the port information stored in the storage unit to determine a destination communication port, the destination communication port being one of the plurality of communication ports, the transmission unit further configured to transmit a frame including the function of the device connected to the destination communication port and one of a control information for controlling the device and a device control information, the device control information being based on the control information, and transmits the frame to the peripheral vehicle-mounted apparatuses.

2. The vehicle-mounted apparatus according to claim 1, wherein the storage unit further stores communication method information indicating correspondence between the plurality of communication ports and a communication method to be used when the peripheral vehicle-mounted apparatus transmits the control information or the device control information to the device via any one of the plurality of communication ports, and
the transmission unit includes, based on the communication method information stored in the storage unit, setting information, which indicates a communication method to be used when transmitting the control information or the device control information, in the frame together with the control information, and
transmits the frame to the peripheral vehicle-mounted apparatuses.

3. The vehicle-mounted apparatus according to claim 1, wherein the port information indicates functions of the devices connected to the respective communication ports, and
the transmission unit also includes identification information of the function of the device to be controlled in the frame and transmits the frame to the peripheral vehicle-mounted apparatus.

4. The vehicle-mounted apparatus according to claim 1, wherein when a device is newly connected to a communication port to which no device has been connected, information relating to the device is added to the port information without updating the information stored in each peripheral vehicle-mounted apparatus.

5. The vehicle-mounted apparatus according to claim 1, wherein the port information is updatable using an apparatus which is capable of being connected by wires to a vehicle in which the vehicle-mounted apparatus is mounted.

6. The vehicle-mounted apparatus according to claim 1, wherein the port information is updatable by OTA (Over The Air).

* * * * *